United States Patent Office 3,537,893
Patented Nov. 3, 1970

3,537,893
METHOD OF PRODUCING SURFACTANT-MODIFIED STARCH
Norbert Hauser, Oberndorf, Germany, and Kassian Greif, Altendorf, Switzerland, assignors to Neckar-Chemie Dr. Heinrich Kopp KG., Aistaig, Germany
No Drawing. Filed Oct. 30, 1967, Ser. No. 679,187
Int. Cl. C13l 1/08
U.S. Cl. 127—71   12 Claims

ABSTRACT OF THE DISCLOSURE

Modifying starch by forming a suspension thereof in an aqueous solution of a surfactant, heating said suspension to at least the swelling temperature of the starch, but below the gelatinization temperature thereof, so as to cause at least partial swelling of the same, and substantially separating the thus treated starch from said aqueous solution.

BACKGROUND OF THE INVENTION

The present invention relates to a method of producing modified starches.

Native starches are used to a large extent for cosmetic purposes, particularly in view of their ability to absorb aqueous liquids and fat. Thus, starches are used as components of mixtures for hydrophobic powder bases, such as talcum, zinc oxide, magnesium stearate and the like. Starches are also incorporated into compositions for the dry shampooing of hair and serve in such compositions for defatting the hair.

In the pharmaceutical industry, native startches are used as fillers and as disintegrating agents in the production of solid peroral medications. As disintegrating agents, the starches serve for breaking down solid medications, such as tablets upon contact with water. This is accomplished by the ability of the starch to suck water into the interior of the tablet or pill. In this manner, dispersion of the medication during ingestion is facilitated.

The absorptive capacity of native starches, however, depends on various factors and is highly variable and this results in considerable disadvantages.

Thus, the absorptive capacity is dependent on the moisture content of the atmosphere and therefore varies under different atmospheric conditions. If it is required that the starch has a constant and substantially unchanging absorptive capacity, it is necessary to dry the starch at a relatively low temperature, for instance at 40° C., in order to prevent chemical changes in the starch during the drying, and this requires time and expenses. Starches prepared in this manner have only a limited capacity for absorbing water or other liquids, which, for instance in the case of potato starch, amounts to only 0.9 ml./g. for water, and up to 0.4 ml./g. for oil.

The absorptive capacity depends on the type of starch, the size of the starch kernels or granules and, even within one type of starch, on the conditions under which the starch-bearing plant has been grown. A further disadvantage of the use of native starches for the above-discussed purposes will be found in the fact that water absorption at room temperature does not cause enlarging of the starch granule so that starch-containing porous bodies or bodies which had been formed by compression at relatively low pressures will not be disintegrated upon immersion in water.

Furthermore, native starches do not possess an adhesive or binding effect with respect to particles of other substances. For this reason, particularly finely pulverulent substances which cannot be directly compressed must be first granulated before being compressible in combination with starch to form a shape-retaining body. For this purpose, the finely pulverulent substances, may have to be pressed, for instance through a screen or the like, after admixing thereto an adhesive or sugar solution, and thereafter the thus formed granules are to be dried. Only thus formed granulated masses can then be pressed into tablets, due to their surface configuration which permits certain interlocking of the granules. The work and expense involved is considerable particularly in the case of water-soluble substances.

It is a further disadvantage of the use of native starches for the above-discussed purposes, that they tend to adhere and generally are not free-flowing. In view thereof, the free-flow of a starch-containing mixture into a device for forming under pressure tablets or the like thereof, is difficult to control and upon deviations of the standard rate of flow, an uneven filling of the tablet-forming mold portions will take place and thus the individual tablets will not be of the desired uniform weight.

When utilizing native starches for cosmetic purposes, their adherence to other bodies is particularly disadvantageous in the use of starch-containing dry mixtures for shampooing hair. Due to the strong adherence of the starch component of such shampoos to the hair, it is very difficult to remove residual portions of the dry hair shampoo from the hair. Remaining powder which is still adhered to the hair will dull the appearance of the latter and residual material remaining in contact with the scalp might lead to itching necessitating after a short period of time a wet washing or shampooing of the hair.

SUMMARY OF THE INVENTION

The above-discussed disadvantages are overcome by subjecting the starch to a modifying treatment according to which a suspension of the starch in an aqueous solution of a surfactant or interface active agent (the term "surfactant" is meant to denote broadly surface-active agents but, more specifically, an interface active agent which may be defined as a compound which will be distributed in a solvent therefor in such a manner that the concentration of the compound at the boundary faces is greater than in the interior of the solvent, thereby causing a reduction of the surface tension of the solvent. Recently, the term "Tenside" has been used to denote interface active agents). The aqueous suspension of starch and surface active agent is heated to a temperature sufficiently high to cause at least partial swelling of the starch granules in contact with the surfactant-containing aqueous solution but without causing gelatinization of the starch. The thus at least partially swollen starch particles are then separated from the solution. Since the partially swollen starch could be filtered out only with difficulties, it is proposed according to a preferred embodiment of the present invention to add to the solution having the partially swollen starch suspended therein an organic solvent which is miscible with water and the presence of which will cause the starch to become more easily filterable. It is also possible to have such organic solvent incorporated in the aqueous surfactant solution prior to heating the starch suspension therein. In any event, the starch which had been subjected to at least partial swelling in the presence of the surfactant is then separated from the aqueous surfactant-containing solution, for instance by filtration, or also by spray-drying, and—if necessary—the thus separated starch may be further dried in conventional manner.

DESCRIPTION OF THE PREFERRED EMBODIMENTS

It has been found according to the present invention that new types of modified starches which overcome the difficulties discussed further above and which are connected with the use of native starches, can be obtained by heating the native starch in an aqueous suspension thereof in the presence of surface-active, particularly interface-active, amphiphile materials such as wetting agents, soaps and emulsifiers up to the swelling point of the starch, thereafter introducing into the suspension containing the partially swollen starch a solvent which is miscible with water and which will withdraw from the thick starch solution the surface-active agents and water, so that the starch may then be more easily separated and dried. The term "Amphiphile Materials" is means to denote materials the molecules of which have hydrophobic as well as hydrophilic end portions and which thus have, in aqueous solution, surface active properties.

The heating of the native starch in the surfactant solution is to be carried under such conditions that the individual starch granules are swollen, however without gelatinizing the same.

Thus, the "swelling point" to which the starch suspension is to be heated in accordance with the present invention (although the suspension may also be heated to a somewhat higher temperature) is the temperature at which swelling of the starch granules has started to a significant extent; however, heating need not be continued to the point where the starch granules are completely swollen, although it is also within the scope of the present invention to continue heating until the starch granules are completely swollen and in a condition just short of gelatinization. Subsequent separation of the starch from the aqueous solution may be carried out by spray drying.

Suitable interface-active agents include anionic, cationic, amphoteric as well as non-ionic surface-active agents, such as the anionic surfactants sodium dodecylbenzene sulfonate, propyleneglycolmonostearate, the cationic surfactants cetyltrimethyl ammoniumchloride, cetylpyridiniumchloride and dimethylbenzylammonium chloride, the amphoteric surfactant betaine, polyoxyethylenesorbitanemonooleate, sorbitanemonolaurate and the like.

Suitable anionic interface-active compounds include, in addition to sodium dodecylbenzene sulfonate, the 2, 3, 4, 5 and 6 phenylalkane sulfonates of alkanes with 10–13 carbon atoms, for instance, phenyldecane sulfonate, phenylundecane sulfonate, phenyldodecane sulfonate, phenyltridecane sulfonate, sodium lauryl sulfonate, tetrapropylenebenzene sulfonate, sodium salts of the fatty acid methyltaurine ($CH_3.NH.CH_2.CH_2.SO_3Na$), sodium salt of dioctylsulfosuccinic acid ester, etc.

Suitable non-ionic interface-active substances include: Fatty acids of polyvalent alcohols such as 1,2-propyleneglycolmonostearate, triethylenoglycoldilaurate; fatty acid esters with at leats three-valent alcohols, such as glycerolmonostearate and the glycerol mono- or mono/dioleate or ricinoleate thereof; fatty acid esters of sorbitan, such as sorbitanmonolaureate, sorbitanmonopalmitate, sorbitanmonostearate, sorbitantristearate, sorbitanmonooleate and sorbitantrioleate; fatty acid alkylol amides, such as oleic acid diethanolamide, oleic acid monoethanolamide, coconut fatty acid diethanolamide, coconut fatty acid monoethanolamide and lauric acid diethanol amide; ethoxylated fatty acid partial esters such as glycerolmonostearate with two ethylene oxides; ethoxylated fatty acid partial esters of sorbitan, such as polyoxyethylene (20) sorbitan monolaurate, polyoxylene (20) sorbitan monopalmitate, polyoxyethylene (20) sorbitan monostearate, polyoxyethylene (20) sorbitan tristeareate, polyoxyethylene (20) sorbitan monooleate and polyoxyethylene (20) sorbitan trioleate; fatty acid esters of polyglycols, such as polyethyleneglycol-400-monolaurate and polyethyleneglycol-di-fatty acid esters; the mono- and di-laurin, stearin-, olein- and ricinolfatty acid esters of polyethyleneglycol fatty acid esters 200, 300, 400, 600 and 1000; ethoxylated fatty alcohols (fatty alcohol polyglycol ethers); ethoxylated alkylphenols, such as nonylphenol polyglycol ether and lauryl alcohol polyglycol ether; polyethylene glycols for instance of the series with increasing molecular weight 200, 300, 400, 600, 1000 and 1500; and their fatty acid esters, such as polyethylenglycol-400-monolaurate, polyethyleneglycol-200-dilaurate (these polyethyleneglycoldilaurates and diolerates may have molecular weights of, for instance, 200, 300, 400, 500, 600, 1500 or 4000).

These and other interface-active substances may be used to cause swelling of the starch without gelatinization of the latter.

Suitable solvents for facilitating the separation of the treated starch from the aqueous solution include methanol, ethanol, propanol, 2-propanol, 2-methyl-2-propanol, 1,4-butanediol, 1,4-pentadiol, acetone, 1,3-dioxane, 1,4-dioxane, pyridine and the like.

Such water-soluble solvent preferably is added in an amount equal to at least 15% of the reaction mixture. There is no well defined upper limit. The greater the proportion of added solvent, the more will be the separation of the swollen starch facilitated. Frequently, it is desirable to form a mixture of equal amounts of solvent and reaction mixture. The optimum proportions generally will be determined by economic considerations and the solubility of the surfactant in the final water-solvent mixture.

The swelling of the native starch may also be carried out in a mixture of water and water-soluble organic solvent having the surfactant dissolved therein, in which case it will not be necessary to introduce the water-miscible organic solvent after swelling of the starch has been accomplished, and the starch may then be separated by spray-drying.

It is also within the scope of the present invention to introduce into the wet starch cake pulverulent organic and/or inorganic substances such as polyvinylpyrrolidone, amorphous silicic acid and the like, and then to dry the thus-treated starch cake in conventional drying devices which may be either high-speed driers or driers which require a prolonged period of time for the drying of the product. The residual moisture content of the final product may be reduced thereby close to zero or absolute dryness.

As discussed above, spray-drying by means of conventional spray drying devices may also be employed for the drying of a suspension of starch which has been subjected to swelling.

It is essential, according to the present invention, to subject the starch granules to swelling—but not to gelatinization or conversion into a paste.

If the heating of the native starch is carried out in a surfactant-containing aqueous solution which also includes a dispersed or dissolved inorganic or organic material, for instance a dyestuff, or a medicinal preparation, then it is possible by proceeding in accordance with the present invention to produce correspondingly dyed or impregnated dried modified starch products.

Suitable additions, depending on the ultimate use of the treated starch, include polyvinyl pyrrolidone, amorphous silicic acid, finely subdivided cellulose or kieselguhr, various certified food colors, as well as bacteriostatic and fungostatic agents.

It is possible to obtain by the above-described method of the present invention products which are capable at room temperature to absorb spontaneously hydrophilic as well as hydrophobic liquids, whereby a considerable enlarging of the starch granule takes place without gelatinization of the same. Thus, for instance, modified potato starch produced in accordance with the process of the present invention is capable of absorbing 2 ml./g. water or 0.8 ml./g. oil.

This quality of the modified starch produced according to the present invention is utilized for pharmacological purposes for the disintegration of tablets for peroral administration. Thereby, the spontaneous increase in volume which will take place when the tablet is contacted by water or the like is of particular advantage because the swelling pressure created thereby will cause disintegration even of porous bodies having the thus-modified starch incorporated therein.

Furthermore, the modified starches produced according to the present invention possess also a certain binding or adhesive property. It is possible to convert the modified starch of the present invention per se or in combination with hydrophilic or lipophilic agents such as medicinal preparations into a granular form by the simple expedient of moistening with water and the thus formed granules dry very quickly and without substantial heat requirements. The tablets formed of mixtures including the modified starch of the present invention have good strength characteristics whereby nevertheless the disintegrating effect of the modified starch, upon exposure of the tablet to liquid such as water or oil, will be maintained.

The starch products produced according to the present invention have little adherence to each other; however, they are easily flowable and thus, when mixed with subdivided substances which have poor flow characteristics and which do not easily slide along surfaces, such as hoppers or funnels from which the mixtures are to be introduced into tabletting machines, incorporation of the modified starch according to the present invention will facilitate the flow of such mixtures. The adherence of particles to each other is thus reduced by the incorporation of the modified starch of the present invention without substantial changes in the initial weight per unit of volume of the pulverulent mixture.

For cosmetic purposes, these properties are desirable in order to improve the distribution of powder upon scattering or dusting of the same.

A preferred use of the modified starch of the present invention will be found in preparations for the dry shampeeing of hair, wherein the low adherence of the modified starch particles to each other and their ability to very quickly absorb oil will be particularly advantageous. In addition, the modified starch according to the present invention appears to have an antistatic effect which facilitates the brushing out of residual material from the hair. In view thereof, incorporation of the modified starch of the present invention in shampoo compositions for the dry shampooing of hair will result in a very loose shiny hair which is free of residual portions of the shampooing composition and the shampooing can be carried out very quickly and easily. The antistatic effect of the modified starch of the present invention is increased if the surfactant which has been dissolved in the aqueous starch suspension prior to swelling of said starch will be a cationic interface active agent.

The following examples are given as illustrative only, without, however, limiting the invention to the specific details of the examples.

Example I 30 grams potato starch are heated under constant stirring in a solution of 0.3 gram polyoxyethylenesorbitane-monooleate in 70 grams water. 90 grams acetone are introduced into the thus-obtained swollen mass and thereafter the modified starch is separated by filtration and dried at about 40° C.

Example II 30 grams rice starch are heated under stirring in a solution of 1 gram cetyltrimethylammoniumchloride and 70 grams water to a temperature of about 58° C. To the thus-obtained suspension of swollen starch, 40 grams ethanol are added under stirring and thereafter the starch is separated by filtration and dried at about 70° C.

Example III 30 grams corn starch are heated under stirring in a solution of 0.3 gram polyoxyethylenesorbitanemonopalmitate, 0.2 gram quinophthalonedisulfonic acid in 70 grams water, until a temperature of about 70° C. is reached. To the thus-obtained mass of partially swollen starch granules, a solution of 0.5 gram glycerol in 95 grams 2-propanol is added the swollen starch separated by filtration and dried at 80° C.

Example IV 30 grams corn starch are introduced into 100 grams of a mixture of 32 grams ethanol and 68 grams water, 3.5 grams of a dodecylpolyglycol ether which has been cross-linked with 10 mols ethylenoxyde are added and the mixture is heated to 73° C. The thus obtained swollen starch is separated by filtration and the thus obtained starch cake mixed with 1% amorphous silicic acid and dried at 110° C.

Example V 25 grams potato starch are heated under stirring in 80 gams of an aqueous solution containing 0.5 gram betaine until a temperature of 70° C. is reached whereby swelling of the starch will be accomplished. The thus obtained mixture is then spray-dried at 250° C.

Preferably, the interface-active agent will be present in the solution in a concentration of between about 0.05% and 5.0%.

Larger proportions of starch than the above-described about 30 grams in 70 to 100 grams water may be treated in accordance with the present invention. However, technical difficulties may be caused by increasing the proportion of starch so that upon swelling of the starch the reaction mixture becomes substantially solid. A liquid medium is required to support the swelling of the starch. The maximum proportion of starch probably would be about 60 parts by weight of starch in 100 parts by weight of liquid.

Heating of the starch in an aqueous medium having the interface-active substance dissolved therein may be immediately followed by spray drying. It is thus also possible to carry out the method of the present invention in a continuous manner, whereby the reaction mixture is subjected to spray drying as soon as swelling of the starch has been accomplished.

Apparently due to the presence of the surfactant, it is possible to heat the suspended starch to somewhat above its swelling temperature (the swelling temperatures of the various types of starch are known to those skilled in the art) without risking gelatinization, i.e., the withdrawal of amylose from the starch grain. It is thus not required to heat exactly to the swelling temperature, although heating must be carried out at least to swelling temperature.

The types of starch described in the examples may also be replaced by starches, preferably native starches, of different origin, such as tapioca, sago, sweet potato, arrowroot, waxy sorghum, waxy maize, Tahiti arrowroot and wheat starch.

Without further analysis, the foregoing will so fully reveal the gist of the present invention that others can by applying current knowledge readily adapt it for various applications without omitting features that, from the standpoint of prior art, fairly consttiute essential characteritsics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Method of producing modified starch, comprising the steps of forming a suspension of starch in an aqueous solution of an interface-active agent; heating said suspension to at least the swelling temperature of said starch but below the gelatinization temperature thereof so as to cause at least partial swelling of the same; introducing an organic, watermiscible solvent into said suspension so as to convert the at least partially swollen starch into a more easily separable condition; and separating the modified starch from said aqueous solution.

2. A method as defined in claim 1 wherein said separated starch is subjected to drying.

3. A method as defined in claim 1 wherein said starch is a native starch selected from the group consisting of potato, corn, rice, tapioca, sago, sweet potato, arrowroot, waxy sorghum, waxy maize, Tahiti arrowroot and wheat starch.

4. A method according to claim 1 wherein said organic solvent is present in the suspension of said starch in said aqueous solution prior to causing swelling of said starch.

5. A method according to claim 1, wherein said heating of said suspension is carried out so as to cause substantial swelling of the starch granules, but substantially without causing gelatinization of the starch.

6. A method as defined in claim 1, wherein said solvent is selected from the group consisting of methanol, ethanol, propanol, 2 - propanol, 2-methyl-2-propanol, 1,4-butanediol, 1,4-pentadiol, acetone, 1,3-dioxane, 1,4-dioxane, and pyridine.

7. A method according to claim 1 wherein said aqueous solution includes a dissolved dye.

8. A method according to claim 1 wherein said aqueous solution includes a dissolved medicinal agent.

9. Method according to claim 1 wherein said starch is present in said water in a ratio of 30:70–100 to 60:100.

10. Method according to claim 1 wherein said interface active agent is present in an amount of from 0.05 to 5.0%.

11. A method as defined in claim 1, wherein said interface active agent is selected from the group consisting of anionic, cationic, amphoteric and non-ionic surfactants.

12. A method as defined in claim 11 wherein said surfactant is selected from the group consisting of sodium dodecylbenzene sulfonate, propyleneglycolmonostearate, cetyltrimethyl ammoniumchloride, cetylpyridiniumchloride, betaine, polyoxy-ethylenesorbitanemonooleate and sorbitanemonolaureate.

References Cited

UNITED STATES PATENTS

| | | | |
|---|---|---|---|
| 1,858,632 | 5/1932 | Maennchen | 8—91 X |
| 2,400,402 | 5/1946 | Evans | 127—33 X |
| 2,913,359 | 11/1959 | Pollock | 127—71 |

MORRIS O. WOLK, Primary Examiner

SIDNEY MARANTZ, Assistant Examiner

U.S. Cl X.R.

127—32